June 8, 1926.

B. H. BLOOD 1,588,003

THREAD HOBBING MACHINE

Filed Feb. 5, 1920    3 Sheets-Sheet 3

Inventor
Bryant H. Blood
By S. Jay Teller
Attorney

Patented June 8, 1926.

1,588,003

UNITED STATES PATENT OFFICE.

BRYANT H. BLOOD, OF HARTFORD, CONNECTICUT, ASSIGNOR TO PRATT & WHITNEY COMPANY, OF NEW YORK, N. Y., A CORPORATION OF NEW JERSEY.

THREAD-HOBBING MACHINE.

Application filed February 5, 1920. Serial No. 356,476.

This invention relates to improvements in thread hobbing machines and particularly to means for mounting the cutter spindle in an improved and novel manner.

One object of the invention is to provide a conical hob and to mount this hob and its spindle at such an angle to the work holder axis that the side of such hob will engage the work simultaneously at a plurality of points along a definite line between the hob and work.

Another object of the invention is to provide a special form of tailstock and to mount the same on the base of the machine directly adjacent the cutter spindle and entirely in front of the cutter spindle pulley or driving means, such tailstock therefore being adapted to support one end of the work without interfering with the cutter spindle and its driving means.

A further object of the invention is to so mount the cutter spindle that it is adapted to be adjusted to different positions and to operate in such positions with hobbing tools of different shapes, whereby the machine may perform the desired work in the most convenient and efficient manner. More specifically, the object of the invention is to provide a machine adapted to perform a threading operation with either a cylindrical hob or a conical hob, the cutter being adapted to be adjusted to different positions to operate most efficiently on the work.

With the above and other objects in view which will appear as the description proceeds, the invention will be described more specifically by reference to the drawings wherein:

Fig. 5 is a detail sectional view taken on the line 5—5 of Fig. 6.

Fig. 6 is a detail sectional view taken on the line 6—6 of Fig. 2.

Fig. 7 is a detail sectional view taken on the line 7—7 of Fig. 6.

Figure 1:
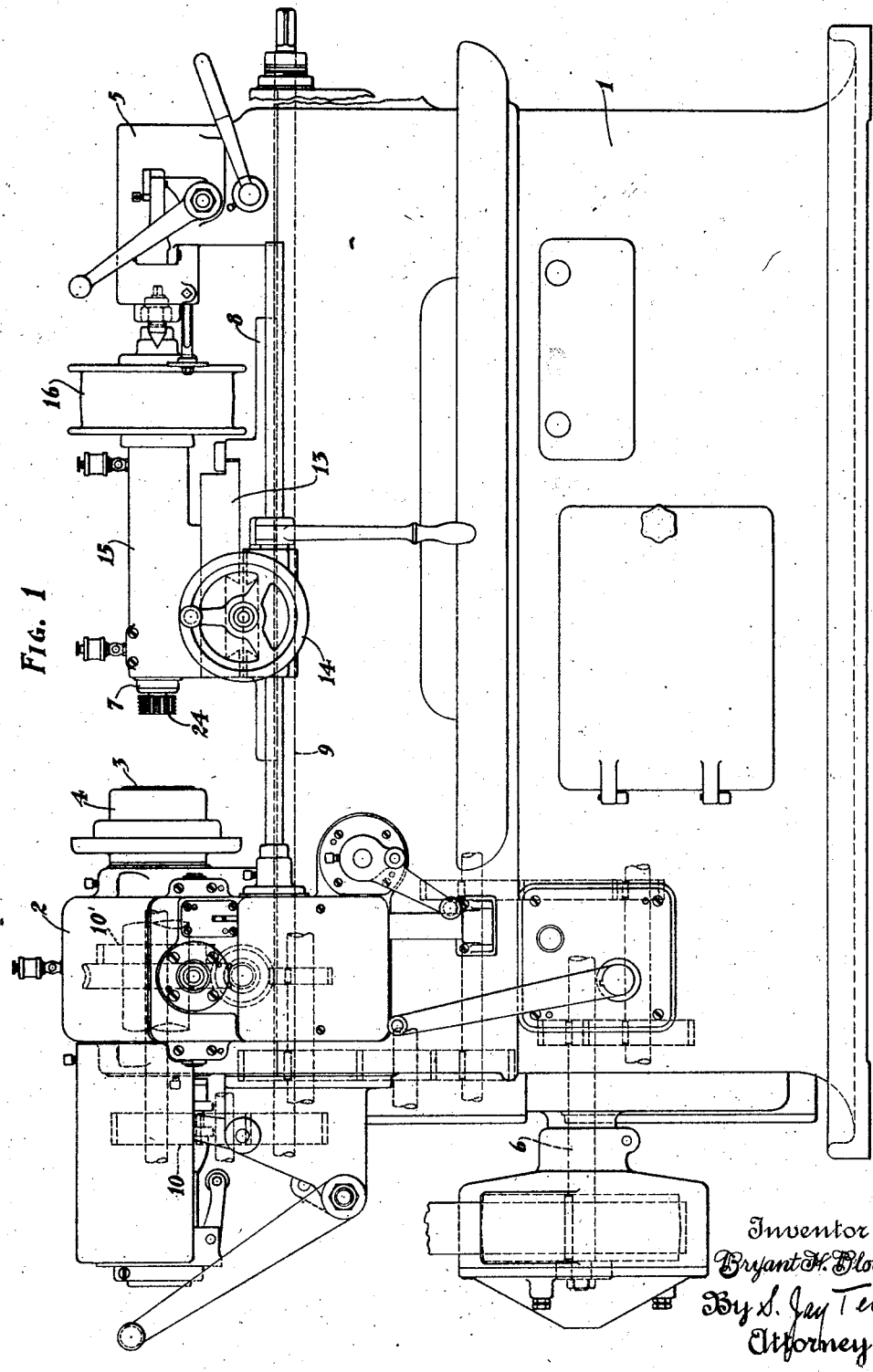
Figure 1 is a side elevation of a machine embodying the present invention.

Referring more especially to the drawings by reference characters, 1 indicates the base or bed of the machine on which is mounted a headstock 2 provided with a rotatable work spindle 3. The work may be supported and driven solely by means of a suitable chuck 4 carried by the spindle or it may be supported in part by the chuck or spindle and in part by a center mounted on a suitable tailstock 5. The work spindle 3 is adapted to be driven from a main driving shaft 6 through any suitable power connections such as those illustrated in dotted lines in Figs. 1 and 2. The machine is provided with a cutter spindle 7, which is adapted to carry a thread cutting hob, having longitudinally spaced cutting teeth conforming to the threads to be cut. The hob may be either of the cylindrical type or the conical type, as illustrated in the drawing, the particular type used depending on the shape of the work to be cut and on the angular position of the cutter spindle. Preferably the cutter spindle 7 is carried by a carriage 8 which is longitudinally adjustable or movable along suitable ways on the bed 1.

Suitable mechanism is provided whereby the hob spindle 7 is operated or fed in synchronism with the rotation of the work spindle 3 in such a manner as to form correct screw threads. While I do not so limit myself, I prefer to provide and have illustrated a hob having annular rows of cutting teeth and when such a hob is provided the synchronous operation takes the form of a feeding longitudinally of the work axis in timed relation with the rotation of the work spindle. In this case the cutter spindle may be rotated at any convenient or suitable speed to secure efficient cutting. As illustrated, the longitudinal feed of the cutter is effected by longitudinally moving the carriage 8, the mechanism for this purpose consisting of a lead screw 9 connected with the work spindle 3 by means of suitable gearing at 10 and 10'. The carriage may be adjusted longitudinally by means of a handle 11 adapted to operate a nut 11' rotatably threaded on the lead screw 9 and rotatably mounted in the carriage 8. As already stated, the cutter may, with the present construction, be driven at any suitable speed. As illustrated, the cutter spindle 7 is driven from the drum 12 preferably operated from the main shaft 6 through the connections illustrated in Fig. 2. It will therefore be seen that all parts of the machine may be driven from the same source of power and that the movement of the tool carriage longitudinally is directly under the control of the rotation of the work spindle 3.

As heretofore stated, it is an object of this invention to provide means for supporting the cutter spindle in different relative positions whereby the particular operation to be performed may be done with the maximum ease and efficiency. To this end, the transverse slide 13 movable on its support by means of a hand wheel 14 is adapted to support a frame 15 thereon in different relative positions. The cutter spindle is mounted on this frame adjacent the work holder and carries a driving means, as the pulley 16, at its outer end. Belt-tightening and guiding pulleys 17 are mounted in line with the pulley 16 on a bracket 18 secured to the frame by screws or otherwise. These pulleys may be adjusted to the proper belt-tightening position by means of the thumb nut 19. The frame may be secured on its support by any proper means, as by tap bolts 20, 20$^a$ and 20$^b$ adapted to be threaded into any one of a series of tapped holes 21, 21$^a$ and 21$^b$; 21, 22 and 22$^a$; or 23, 23$^a$ and 23$^b$.

Figure 3:
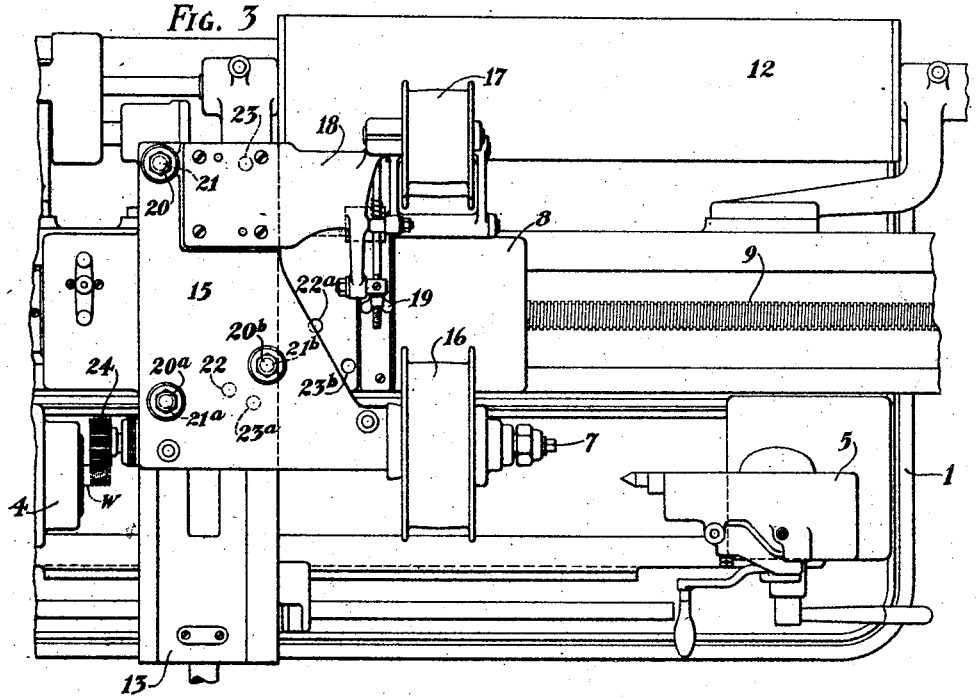
Fig. 3 is a fragmentary detail view showing the cutter spindle in one of its operative positions parallel to the work holder axis.

In Figs. 1 and 3, I have shown the frame as mounted in the first position with the securing tap bolts engaged in holes 21, 21$^a$ and 21$^b$. In this position the cutter spindle is parallel with the work spindle and adapted to operate on the work W with a cylindrical hob 24. This position of the spindle is used in operation on short chuck work or work secured entirely within the chuck 4 without the aid of the tailstock. As illustrated in Figs. 1 and 3, the tailstock 5, not being used in this operation, is drawn back to its extreme rearward position on the bed.

Figure 2:
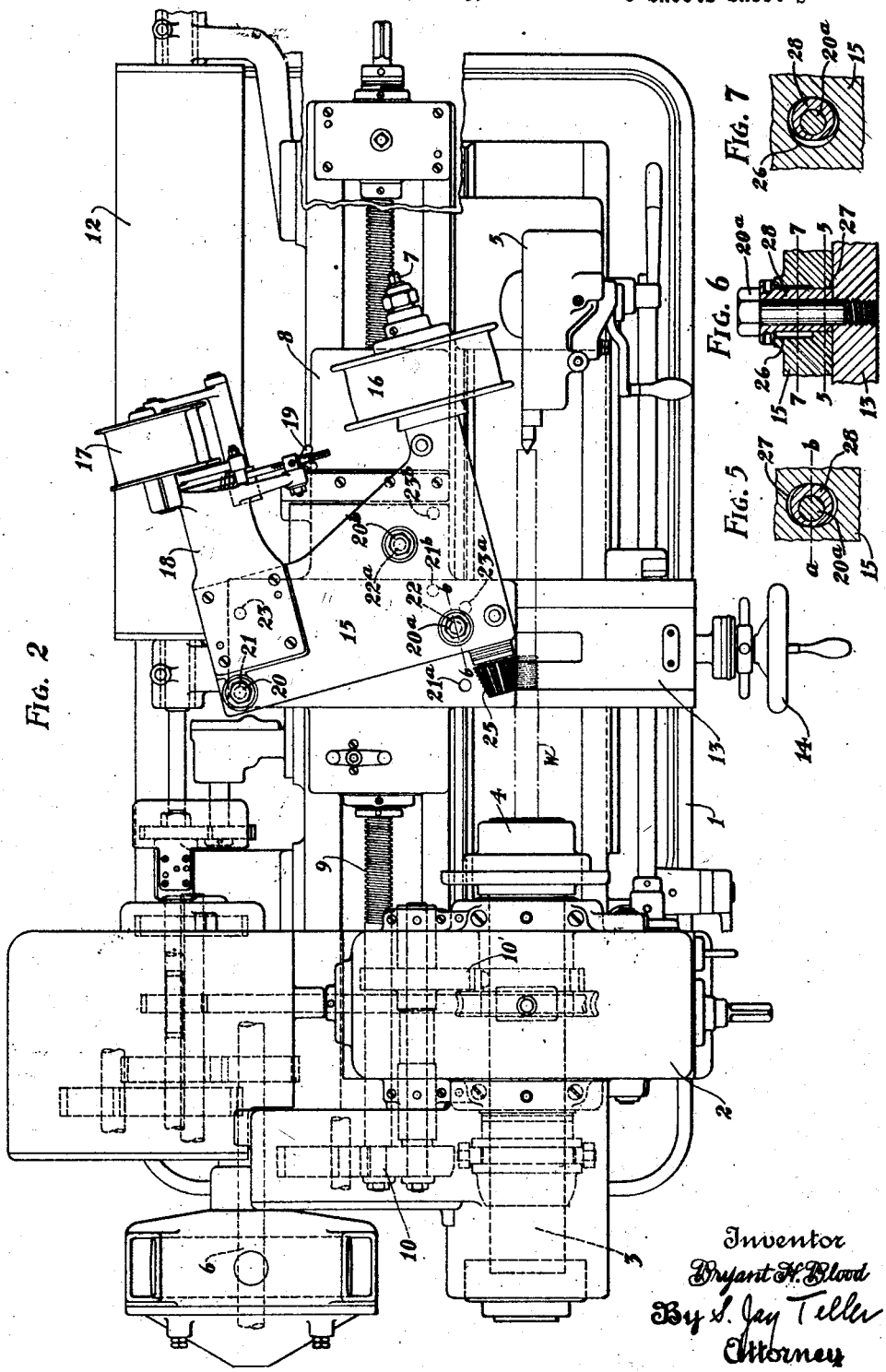
Fig. 2 is a plan view of the same showing a conical hob or cutter mounted in the cutter spindle and the spindle in an angular position relative to the work holder axis.

When performing a threading operation on cylindrical work by means of a cylindrical hob or cutter it is necessary that the cutter spindle axis be parallel with the rotary axis of the work. When operating on relatively long work between the ends thereof or adjacent the headstock 2, such work being supported between the headstock and tailstock, the difficulty of properly supporting and operating the cutter spindle so close to the work and tailstock is presented. To avoid this difficulty I have herein substituted a conical hob 25 for the cylindrical hob, which construction permits and necessitates an angular arrangement of the cutter spindle relative to the rotary axis of the work. In such construction, the cutter is mounted on the end of the cutter spindle adjacent the work, and the driving means, as the pulley 16, is mounted on the end of the spindle spaced from the work and opposite the tailstock as shown in Fig. 2, such spacing of the spindle providing sufficient space for the operating parts of the cutter spindle. Accordingly, in Fig. 2 the frame is shown as mounted in the second or angular position with the securing tap bolts engaged in the holes 21, 22 and 22$^a$. To obtain this position of the frame 15 the bolts 20$^a$ and 20$^b$ are removed and the frame is swung about the bolt 20 to the angular position shown and wherein the bolts 20$^a$ and 20$^b$ may be screwed into the tapped holes 22 and 22$^a$. The cutter spindle is shown in this figure as provided with a conical hob 25 which is adapted to engage the work W simultaneously at a plurality of points along a definite line between the axes of the hob and work. In this position the cutter spindle is arranged with its longitudinal axis at an angle to the axis of the work holder and when using a true conical hob, such as illustrated in Fig. 2, the axes of the cutter spindle and the work holder are in a common plane. It should further be noted that the angle between the cutter spindle axis and the work holder axis conforms to the sum of the angles formed between the line of engagement of the hob and work and the respective axes thereof.

Figure 4:
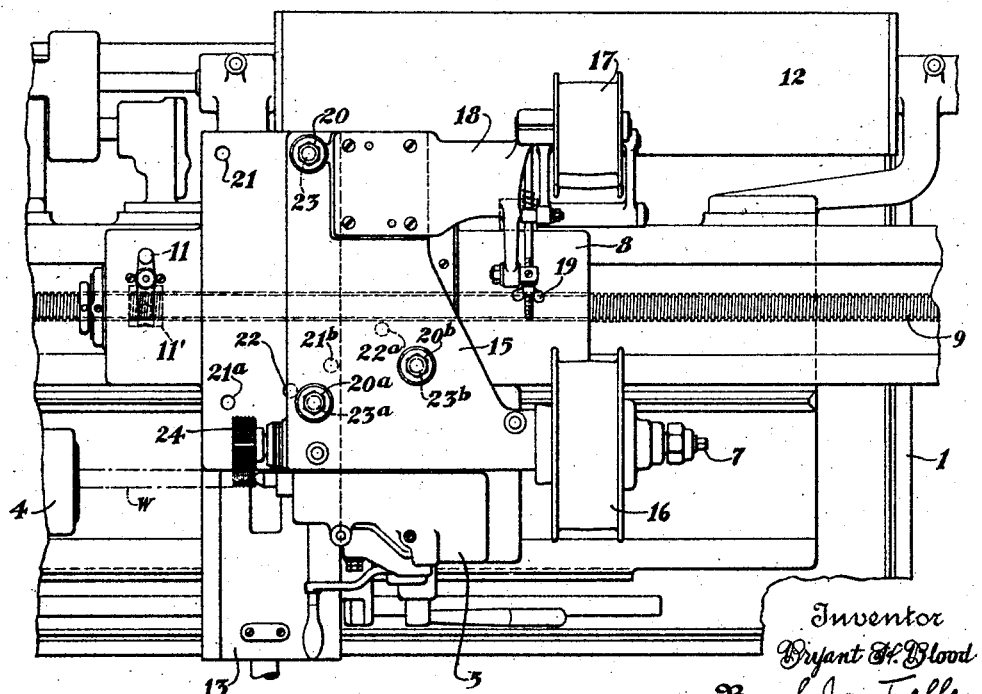
Fig. 4 is a like view showing the cutter spindle in another position.

Fig. 4 illustrates another position of the cutter spindle and its relation to the tailstock and other parts of the machine when operating on the tailstock end of work supported by both the headstock and tailstock. The frame 15 is herein shown as secured by the tap bolts engaging in holes 23, 23$^a$ and 23$^b$. This position of the cutter spindle is like that illustrated in Fig. 3 except that the cutter is in a different longitudinal position on the slide 13. The tailstock is made of the special form illustrated for the purpose of supporting the work W in axial alinement with the headstock spindle and at the same time of fitting closely adjacent the cutter spindle. The operating handles of the tailstock project directly away from the cutter spindle and the pulley 16 is adapted to extend beyond and overlap the tailstock. Such construction permits firm support of the work at both ends, support of the cutter spindle parallel to the work axis and at the same time provides sufficient space for the pulley 16 or other operating means for the cutter spindle.

It should be noted that in securing the positions illustrated in Figs. 2 and 3, the frame 15 is swung about the bolt 20 which acts as a pivot remote from the work holder axis. Because of the remoteness of this pivot the location of the cutter in these two adjustments are quite widely separated. It should further be noted that in the two adjustments illustrated in Figs. 2 and 4 the cutters are approximately in the same location in each adjustment, the parallel adjustment of the spindle shown in Fig. 4 however adapting the machine to operate with a cylindrical hob on cylindrical work and the angular adjustment shown in Fig. 2 adapting the machine to operate either on cylindrical work with a conical hob or with a cylindrical hob on conical work.

When milling screw threads it is very essential that the hob be in a definite angular position relative to the work holder axis. This adjustment must be very fine and accurate and accordingly I have designed a special adjusting means for performing this function, this means being illustrated specifically in Figs. 5, 6 and 7. The hole in frame 15 through which the tap bolt 20$^a$ passes (Fig. 6) is provided with a circular outer portion 26 (Fig. 7) and an oval inner portion 27 (Fig. 5). An eccentric bushing 28 surrounds the bolt 20$^a$ and extends entirely through the hole 26, 27. The shorter axis $a$—$b$ (Fig. 5) of the oval hole 27 extends in a direction parallel to the cutter spindle axis and the eccentric bushing 28 engages only the shorter diameter sides of this hole. It will therefore be seen that by rotation of the bushing 28 the frame 15 is adjusted about the pivot bolt 20 as a center and the cutter is adjusted angularly to the work spindle axis. Also the adjusting pressure of the bushing takes place only in the hole portion 27 directly adjacent the supporting slide 13. The opening in frame 15 through which the bolt 20$^b$ extends is oversize sufficiently to allow the slight adjustment defined. After properly adjusting the frame, the three bolts 20, 20$^a$, and 20$^b$ are securely tightened to hold the frame in rigid working position.

While in the drawing I have shown the cutter as operating on external cylindrical work and in the specification I have generally described such an operation, it should be clearly understood that the invention is not limited thereto since the machine is adapted to operate either on internal or external work of cylindrical or conical form, such for example as hobbing either male or female taper threads on pipe couplings with either cylindrical or conical hobs. Reference to the appended claims should be made in determining the scope of the invention.

What I claim is:

1. In a screw thread milling machine, the combination of a headstock, a rotary work holder mounted therein, a tailstock in axial alignment with the work holder, a cutter spindle supported with its axis at an angle to the axis of the work holder, the axes of the cutter spindle and work holder being in a common plane, a conical threading hob mounted on the end of the cutter spindle adjacent the work holder axis and adapted to engage the work simultaneously at a plurality of points along a definite line between the axes of the hob and work, a drive wheel mounted on the end of the spindle, the angular mounting of the cutter spindle being adapted to space the drive wheel from the axis of the work holder and the tailstock, and means operatively connecting the work holder with the cutter spindle whereby the latter is operated synchronously with the rotation of the former.

2. In a milling machine, the combination of a headstock, a rotary work holder mounted therein, a tailstock in axial alignment with the work holder, a cutter carriage, a cutter spindle supported on the carriage directly adjacent and parallel with the work holder axis and the tailstock, and a pulley supported on the rear end of the cutter spindle and movable with the carriage, such pulley being positioned to the rear of and projecting over the end of the tailstock.

3. In a screw thread milling machine, the combination of a rotary work holder, a tailstock in axial alignment with the work holder, a cutter carriage, a cutter spindle supported on the carriage directly adjacent and parallel with the work holder axis and the tailstock, a pulley supported on the rear end of the cutter spindle and movable with the carriage, such pulley being positioned to the rear of and projecting over the end of the tailstock, and means operatively connecting the work holder with the cutter spindle whereby the latter is operated synchronously with the rotation of the former.

4. In a screw thread milling machine, the combination of a rotary work holder, a carriage adjustable longitudinally of the work holder axis, a tailstock in axial alignment with the work holder, a cutter spindle supported on the carriage directly adjacent and parallel with the work holder axis and the tailstock, a pulley supported on the rear end of the cutter spindle and movable with the carriage, such pulley being positioned to the rear of and projecting over the end of the tailstock, and means operatively connecting the work holder with the carriage whereby the latter is fed longitudinally of the work holder axis synchronously with the rotation of the former.

5. In a milling machine, the combination of a headstock, a rotary work holder mounted therein, a tailstock in axial alignment with the work holder, a cutter spindle, a frame for supporting the cutter spindle directly adjacent and parallel with the tailstock, a pulley supported on the rear end of the cutter spindle and movable with the frame, such pulley being positioned to the rear of and projecting over the end of the tailstock, and means for slightly adjusting the frame to adjust the hob angularly of the work holder axis.

6. In a milling machine, the combination of a headstock, a rotary work holder mounted therein, a tailstock in axial alignment with the work holder, a cutter spindle, a pivoted frame for supporting the cutter spindle directly adjacent and parallel with the tailstock, a pulley supported on the rear end of the cutter spindle and movable with the frame, such pulley being positioned to the rear of and projecting over the end of the tailstock, and means for slightly adjusting the frame about its pivot to adjust the hob angularly of the work holder axis.

7. In a screw thread milling machine, the combination of a rotary work holder, a cutter spindle, a threading hob mounted on the cutter spindle and adapted to engage the work simultaneously at a plurality of points along a definite line between the hob and work, a frame for mounting the spindle, a support, means for securing the frame to the support in any one of a plurality of fixed predetermined working positions, the axes of the work holder and spindle being in a common plane in all such positions, and means operatively connecting the work holder with the cutter spindle whereby the latter is operated synchronously with the rotation of the former.

8. In a screw thread milling machine, the combination of a rotary work holder, a cutter spindle, a threading hob mounted on the cutter spindle and adapted to engage the work simultaneously at a plurality of points along a definite line between the hob and work, spindle-supporting means comprising a frame adapted to operatively support the spindle in a position parallel to the rotary axis of the work holder or at an angle thereto, the axes of the work holder and spindle being in a common plane in all such positions, means for rotating the spindle in either of such positions, and means operatively connecting the work holder with the cutter spindle whereby the latter is operated synchronously with the rotation of the former.

9. In a screw thread milling machine, the combination of a rotary work holder, a cutter spindle, a threading hob mounted on the cutter spindle and adapted to engage the work simultaneously at a plurality of points along a definite line between the hob and work, a support, spindle-supporting means comprising a frame pivoted to the support and adapted to be adjusted about its pivot to operatively hold the spindle in a position parallel to the rotary axis of the work holder or at an angle thereto, the axes of the work holder and spindle being in a common plane in all such positions, means for rotating the spindle in either of such positions, and means operatively connecting the work holder with the cutter spindle whereby the latter is operated synchronously with the rotation of the former.

10. In a screw thread milling machine, the combination of a rotary work holder, a cutter spindle, a support, spindle-supporting means comprising a frame pivoted to the support on a pivot remote from the work holder axis, the frame being adapted to be adjusted about the pivot to operatively hold the spindle in a position parallel to the rotary axis of the work holder with the cutter in one position and location or at an angle thereto and with the cutter in another position and location, the axes of the work holder and spindle being in a common plane in all such positions, means for rotating the spindle in either of such positions, and means operatively connecting the work holder with the cutter spindle whereby the latter is operated synchronously with the rotation of the former.

11. In a screw thread milling machine, the combination of a headstock, a rotary work holder mounted therein, a tailstock in axial alignment with the work holder, a cutter spindle, spindle-supporting means comprising a frame adapted to operatively support the spindle in a position parallel to the rotary axis of the work holder or at an angle thereto, a pulley supported on one end of the cutter spindle and spaced to one side of the work holder axis and opposite the tailstock when the cutter spindle is in the angular position, and means operatively connecting the work holder with the cutter spindle whereby the latter is operated synchronously with the rotation of the former.

12. In a screw thread milling machine, the combination of a headstock, a rotary work holder mounted thereon, a tailstock in axial alignment with the work holder, a cutter spindle, spindle supporting means comprising a frame adapted to operatively support the spindle in a position parallel to the rotary axis of the work holder or at an angle thereto, a pulley supported on one end of the cutter spindle and spaced to one side of the work holder axis and from the tailstock when the cutter spindle is in the angular position, means for varying the relative angular position of the cutter spindle by adjusting the spindle support in a manner to move the pulley substantially directly toward or away from the work holder axis, and means operatively connecting the work holder with the cutter spindle whereby the latter is operated synchronously with the rotation of the former.

13. In a screw thread milling machine, the combination of a rotary work holder, a spindle-supporting frame, a cutter spindle mounted therein and adapted to operatively receive either a cylindrical or a conical hob, means for supporting the frame with the cutter spindle parallel with the work holder axis when operating with the cylindrical hob and at an angle thereto when operating with the conical hob, each hob being adapted to engage the work simultaneously at a plurality of points along a definite line between the hob and work and the axes of the hob and work being in a common plane, and means connecting the work holder with the cutter spindle whereby the latter is operated synchronously with the rotation of the former.

14. In a screw thread milling machine, the combination of a rotary work holder, a pivoted spindle-supporting frame, a cutter spindle mounted therein and adapted to operatively receive either a cylindrical hob or a conical hob, means for supporting the frame with the cutter spindle parallel to the work holder axis when operating with the cylindrical hob and at an angle thereto when operating with the conical hob, the frame being adjustable about its pivot to secure the said two positions, each hob being adapted to engage the work simultaneously at a plurality of points along a definite line between the hob and work and the axes of the hob and work being in a common plane, and means connecting the work holder with the cutter spindle whereby the latter is operated synchronously with the rotation of the former.

15. In a screw thread milling machine, the combination of a rotary work holder, a cutter spindle, a support, spindle-supporting means comprising a frame mounted on the support, means permitting adjustment of the frame to different positions to operatively hold the spindle in a position parallel to the rotary axis of the work holder or at an angle thereto, auxiliary means for slightly adjusting the frame angularly of the work holder axis after the frame has been set to working position, and means operatively connecting the work holder with the cutter spindle whereby the latter is operated synchronously with the rotation of the former.

16. In a screw thread milling machine, the combination of a rotary work holder, a cutter spindle, a frame for supporting the spindle, a carriage adjustable longitudinally of the work holder axis, means for securing the frame to the carriage in any one of a plurality of fixed predetermined working positions, the axes of the work holder and spindle being in a common plane in all such positions, and means operatively connecting the work holder with the carriage whereby the carriage is moved longitudinally of the work holder axis in synchronism with the rotation of the former.

17. In a screw thread milling machine, the combination of a rotary work holder, a cutter spindle, spindle-supporting means comprising a frame adapted to be adjusted to operatively support the spindle in a position parallel to the axis of the work holder or at an angle thereto, the axes of the work holder and spindle being in a common plane in all such positions, the cutter being in approximately the same location in both adjusted positions of the frame, means for rotating the spindle in either of such positions, and means operatively connecting the work holder with the cutter spindle whereby the latter is operated synchronously with the rotation of the former.

18. In a screw thread milling machine, the combination of a headstock, a rotary work holder mounted therein, a tailstock in axial alignment with the work holder, a cutter spindle, spindle-supporting means comprising a frame adapted to be adjusted to operatively support the spindle in a position parallel to the axis of the work holder or at an angle thereto, the cutter being in approximately the same location in both adjusted positions of the frame, a pulley supported on one end of the cutter spindle and spaced to one side of the work holder axis and opposite the tailstock when the cutter spindle is in the angular position and being positioned to the rear of and projecting over the end of the tailstock when the cutter spindle is in the parallel position, and means operatively connecting the work holder with the cutter spindle whereby the latter is operated synchronously with the rotation of the former.

19. In a screw thread milling machine, the combination of a headstock, a rotary work holder mounted therein, a tailstock in axial alignment with the work holder, a spindle-supporting frame, a cutter spindle mounted therein and adapted to operatively receive either a cylindrical or a conical hob, means for supporting the frame with the cutter spindle parallel to the work holder axis when operating with the cylindrical hob and at an angle thereto when operating with the conical hob, the cutters being in approximately the same location in both adjustments of the frame, a pulley mounted on one end of the cutter spindle and spaced to one side of the work holder axis and opposite the tailstock when the cutter spindle is in the angular position and being positioned to the rear of and projecting over the end of the tailstock when the cutter spindle is in the parallel position, and means operatively connecting the work holder with the cutter spindle whereby the latter is operated synchronously with the rotation of the former.

20. In a screw thread milling machine, the combination of a rotary work holder, a cutter spindle, spindle-supporting means comprising a carriage adapted to operatively support the spindle in a position parallel to the rotary axis of the work holder or at an angle thereto, the cutter being in approximately the same location in both adjusted positions of the frame and the axes of the cutter and work holder being in a common plane, and means operatively connecting the work holder with the carriage whereby the latter is fed longitudinally of the work holder axis synchronously with the rotation of the former.

21. In a screw thread milling machine, the combination of a rotary work holder, a cutter spindle, a frame for supporting the spindle, a support provided with means permitting adjustment of and for holding the frame thereon in any one of a plurality of definite working positions along the axis of the work holder, and means operatively connecting the work holder with the cutter spindle whereby the latter is operated synchronously with the rotation of the former.

22. In a screw thread milling machine, the combination of a rotary work holder, a cutter spindle, a frame for supporting the spindle, a support provided with means for holding the frame thereon in a relatively forward position with the cutter adjusted to operate closely adjacent the work holder or in another position on the support rearwardly of the first mentioned position, a pulley mounted on one end of the cutter spindle and positioned to the rear of and projecting over the end of the tailstock when the cutter spindle is in the last named position, and means operatively connecting the work holder with the cutter spindle whereby the latter is operated synchronously with the rotation of the former.

23. In a screw thread milling machine, the combination of a bed, a rotary work holder thereon, a cutter spindle, a frame for supporting the spindle, a cutter carriage movable longitudinally on the bed and provided with means for holding the frame thereon in any one of a plurality of definite working positions along the axis of the work holder, means for slightly adjusting the frame angularly of the work holder axis after the frame has been set to working position, and means operatively connecting the work holder with the cutter spindle whereby the latter is operated synchronously with the rotation of the former.

24. In a screw thread milling machine, the combination of a bed, a rotary work holder thereon, a cutter spindle, a frame for supporting the spindle with its axis parallel to the axis of the work holder, a cutter carriage movable longitudinally on the bed and provided with means for holding the frame thereon in any one of a plurality of definite working positions along the axis of the work holder, the rotary axis of the cutter spindle being parallel to the rotary axis of the work holder in all positions of adjustment of the frame, and means operatively connecting the work holder with the cutter spindle whereby the latter is operated synchronously with the rotation of the former.

25. In a screw thread milling machine, the combination of a bed, a rotary work holder thereon, a cutter spindle, a frame for supporting the spindle, a cutter carriage longitudinally movable on the bed, means for securing the frame to the carriage in three fixed predetermined working positions, and means operatively connecting the work holder with the cutter spindle whereby the latter is operated synchronously with the rotation of the former.

26. In a screw thread milling machine, the combination of a bed, a rotary work holder thereon, a cutter spindle, a frame for supporting the spindle, a cutter carriage longitudinally movable on the bed, means for securing the frame to the carriage in three fixed predetermined working positions in the same plane, and means operatively connecting the work holder with the cutter spindle whereby the latter is operated synchronously with the rotation of the former.

27. In a screw thread milling machine, the combination of a rotary work holder, a cutter spindle, a support, spindle-supporting means comprising a frame mounted on the support, such support having means whereby the frame may be adjusted angularly or bodily moved on the support to different working positions and secured in such adjusted positions, and means connecting the work holder with the cutter spindle whereby the latter is operated synchronously with the rotation of the former.

28. In a screw thread milling machine, the combination of a rotary work holder, a cutter spindle, a support, spindle-supporting means comprising a frame pivotally mounted on the support, such support having means whereby the frame may be adjusted about its pivot or bodily moved on the support to different working positions and secured in such adjusted positions, and means connecting the work holder with the cutter spindle whereby the latter is operated synchronously with the rotation of the former.

29. In a screw thread milling machine, the combination of a rotary work holder, a cutter spindle, a carriage adjustable longitudinally of the work holder axis, spindle-supporting means comprising a frame mounted on the carriage, the carriage having means whereby the frame may be adjusted angularly or bodily moved thereon to different working positions and secured in such adjusted positions, and means connecting the work holder with the cutter spindle whereby the latter is operated synchronously with the rotation of the former.

30. In a screw thread milling machine, the combination of a rotary work holder, a cutter spindle, a carriage adjustable longitudinally of the work holder axis, spindle-supporting means comprising a frame mounted on the carriage, the carriage having means whereby the frame may be adjusted angularly or bodily moved thereon to different working positions and secured in such adjusted positions, and means operatively connecting the work holder with the carriage whereby the latter is fed longitudinally of the work holder axis synchronously with the rotation of the former.

In testimony whereof, I hereto affix my signature.

BRYANT H. BLOOD.